July 19, 1955
A. H. LEWIS
2,713,626
WELDING MACHINE
Filed June 10, 1953
4 Sheets-Sheet 1
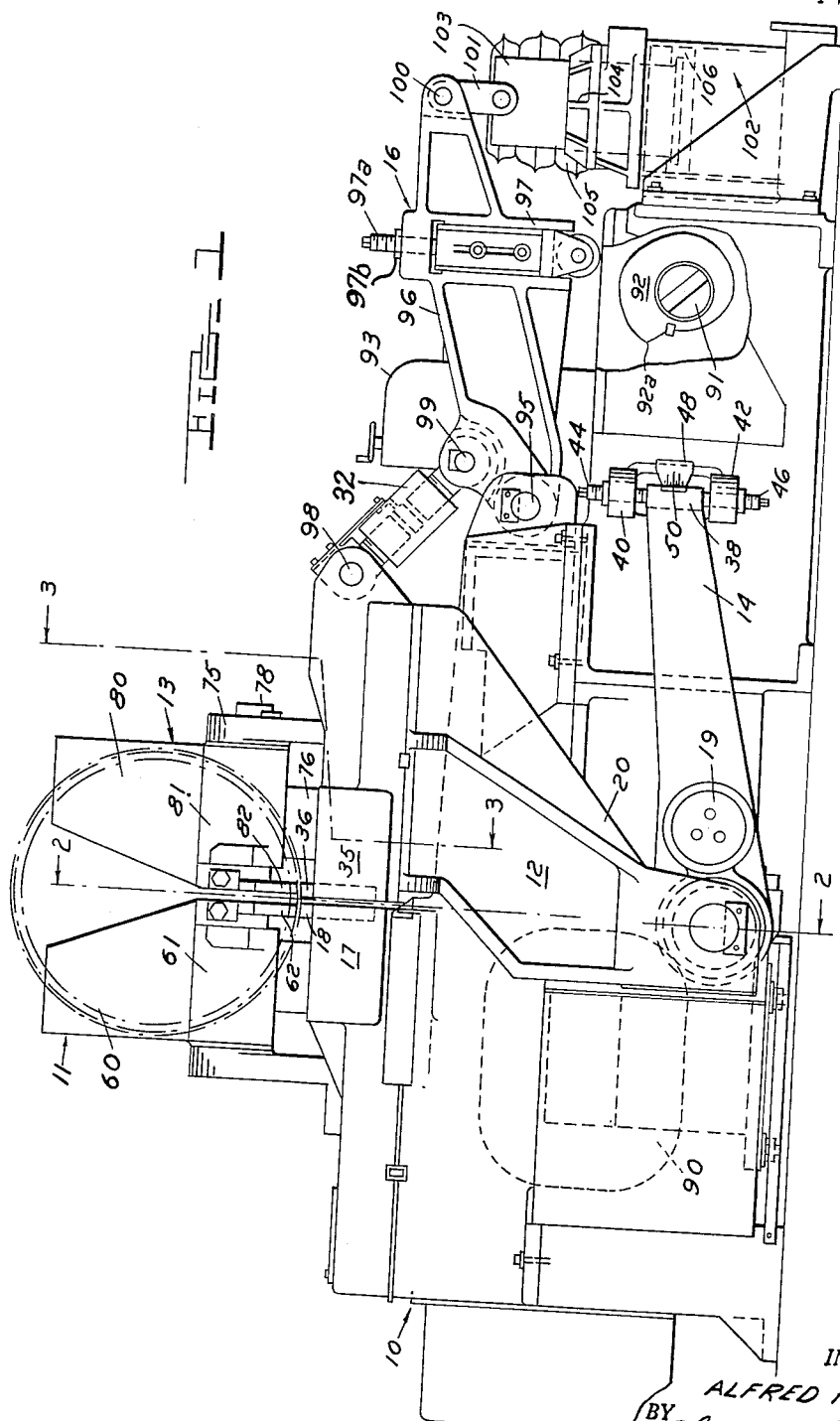
INVENTOR.
ALFRED H. LEWIS
BY
*William D. Sewald*
ATTORNEY

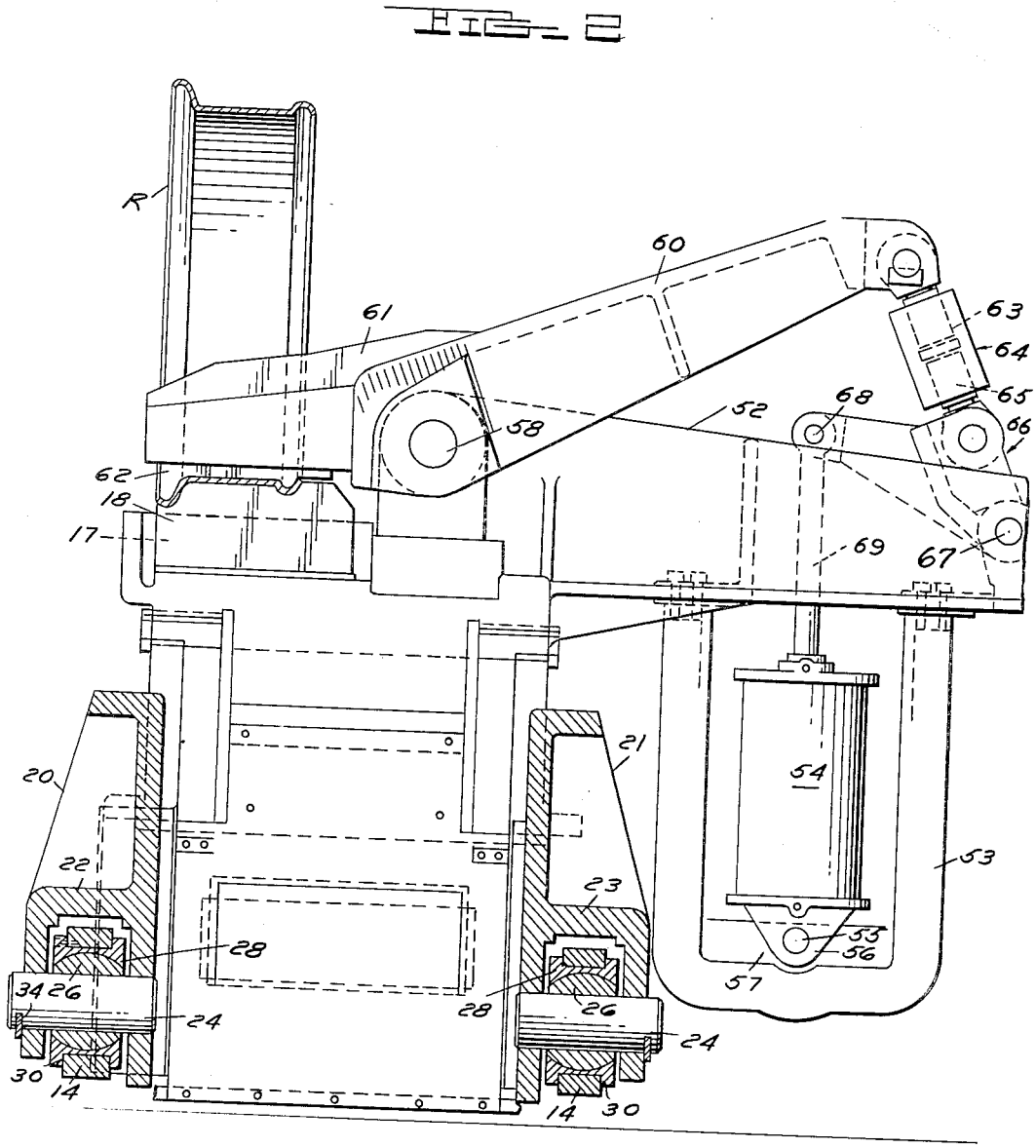

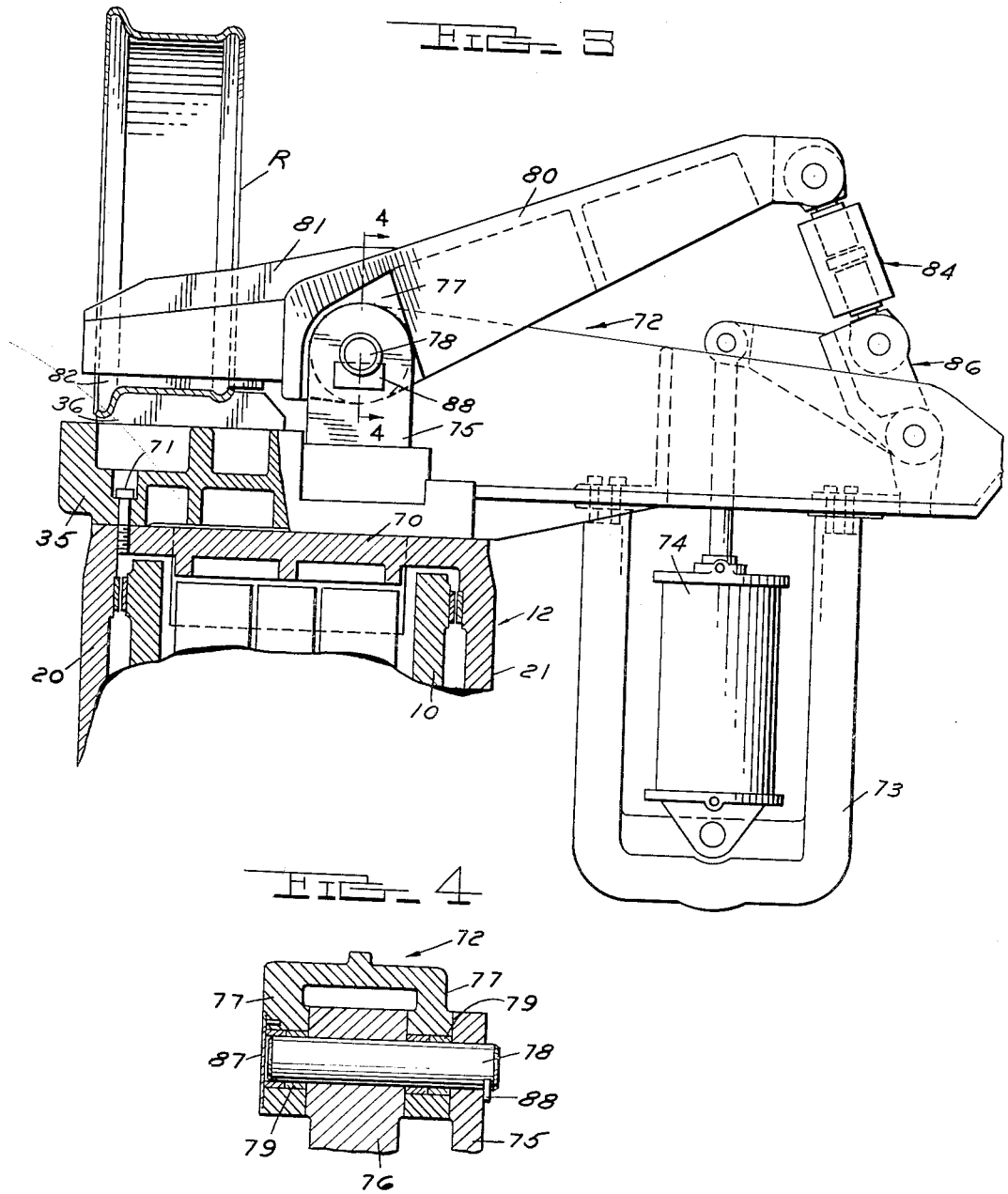

July 19, 1955
A. H. LEWIS
2,713,626
WELDING MACHINE
Filed June 10, 1953
4 Sheets-Sheet 4
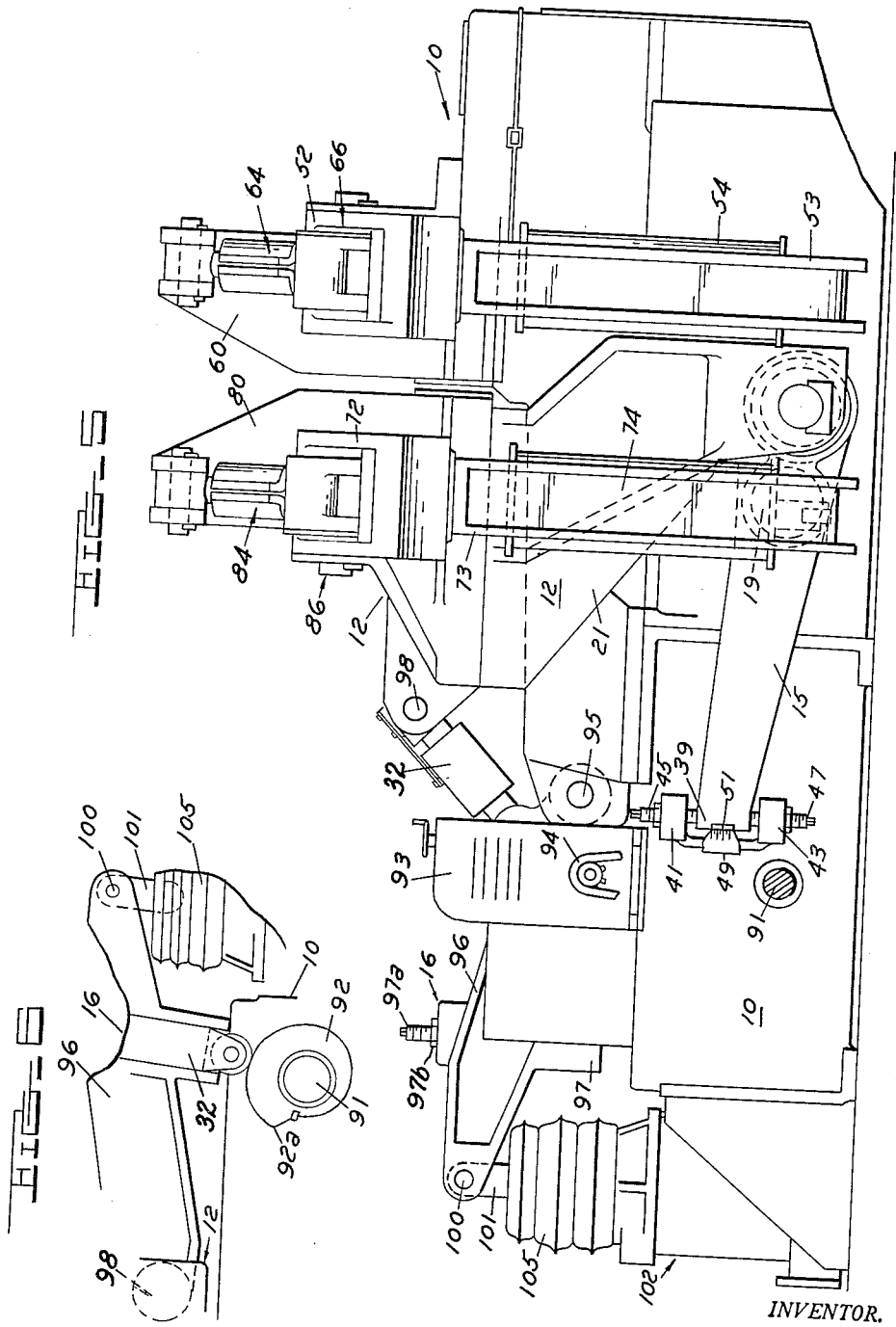
INVENTOR.
ALFRED H. LEWIS
BY
ATTORNEY United States Patent Office 2,713,626
Patented July 19, 1955

2,713,626
WELDING MACHINE

Alfred H. Lewis, Huntington Woods, Mich., assignor to Swift Electric Welder Company, Detroit, Mich., a corporation of Michigan Application June 10, 1953, Serial No. 360,799

14 Claims. (Cl. 219—4)

This invention relates generally to welding machines and in particular to an electric welding machine peculiarly adapted for use in welding wheel rims wherein one end of a wheel rim hoop is clamped between a set of stationary electrodes and the other end of the wheel rim hoop is clamped between a set of movable electrodes with the edges of the ends in abutted relationship; the latter set of electrodes being adjustable with respect to the stationary electrodes so that the abutting edges of the wheel rim will be directly opposite each other in all planes to enable the edges of the rim to be welded together smoothly and evenly in the same plane.

One form of vehicle wheel rim is manufactured from long strips of metal which are cut into approximately correct lengths, provided with tire engaging flanges, and rolled into circular shape so that the rim edges may be welded together. In welding the edges of the rim together it is common to use a welding machine wherein one edge of the rim is clamped in a fixed set of electrodes and the other edge of the rim is clamped in a set of movable electrodes thereby facilitating moving one edge of the rim via the movable electrodes towards the other edge of the rim during which movement an electric welding current is passed between the adjacent edges, heating them, and causing arcing therebetween which burns off projecting points on either edge so that the space between the edges becomes uniform and the material adjacent the edges becomes molten or plastic, enabling the edges, when finally advanced into physical engagement, to unite with one another and form an integral hoop-like rim. In this method the edges of the rim are advanced slowly through a heating cycle and then are more rapidly advanced into physical engagement with each other to merge the edges together.

In this type of operation, it is essential that the edges of the rims be united with each other without any tilt or cock of one edge relative to the other so that the welded juncture of the rim edges is as smooth and continuous as the remainder of the rim. To accomplish this smooth juncture, the electrodes which clamp the adjacent edges of the rims must be accurately positioned relative to one another to hold the rim in the prescribed condition. Through use, the electrodes unevenly wear away or erode with the result that the edges of the wheel rim clamped between the two sets of electrodes are no longer perfectly aligned with each other with the result that wheel rims welded with the electrodes in defective alignment are warped or are otherwise unsuitable. In prior art devices, the defective alignment is remedied by repositioning the electrodes by shimming one set of electrodes relative to the other which necessitates the dismounting of one or both sets of electrodes which means, of course, that the current must be turned off and the machine completely shut down. In the prior art machines it also has been found that the slow advancement of the edges of the rim could not be accelerated fast enough in the welding stage by means of a cam due to the fact that the necessary slope of the cam is so steep as to render the device inoperable. It must be remembered that in the heating or arcing portion of the cycle the edges are advanced slowly together and in the welding portion of the cycle the edges must be moved together at an extremely fast rate of speed which latter action prior art machines have not been capable of satisfactorily performing.

It is an object of the present invention, therefore, to provide an adjustment on one set of electrodes relative to the other set of electrodes so that shimming is unnecessary to adjust the electrodes for wear during use of the machine.

Another object of the invention is to provide a cam actuated heating or arcing stage supplemented by a fast acting pneumatic welding stage which advances the rim edges together at a speed unattainable by means of a cam alone so that the heated edges of the rim are forced together at a very fast rate of speed.

Another object of the invention is to provide pivoted adjustment arms or levers on either side of the machine.

An object of the invention is to provide a saddle straddling the machine and carried by the adjustment levers by means of a universally adjustable joint on either side of the machine so that the saddle is universally movable relative to the remainder of the machine.

An object of the invention is to mount a set of movable electrodes on the universally adjustable saddle.

An object of the invention is to mount a set of stationary electrodes on the machine itself opposite the movable set of electrodes.

An object of the invention is to provide cam actuated and pneumatic actuated toggle means adapted to rock the saddle and the electrodes thereon relative to the body of the machine and to the electrodes positioned thereon to advance and retract the movable set of electrodes relative to the other set of electrodes.

A still further object of the invention is to provide an automatic cycle in the machine so that upon the operator placing a rim edge between the upper and lower portions of each set of electrodes a cycle of operation will ensue by his manual initiation so that the electrodes will automatically clamp the edges of the rim therein; the current will automatically be turned on; a cam will automatically operate the toggle means to move the saddle to carry one edge of the rim slowly towards the other edge during which time arcing, heating, and burning occurs; which automatically actuates pneumatic force in the pneumatic cylinder to suddenly elevate the toggle lever to suddenly advance the saddle and to thereby suddenly move one edge of the rim into physical merging contact with the other edge of the rim; and to thereupon immediately cut off the welding current and unclamp the sets of electrodes, and drop the cam follower on the initial point of the cam thereby repositioning the device and one set of electrodes relative to the other to repeat the cycle whereupon the operator takes the welded rim off the machine and places an unwelded rim thereon.

These and other objects of the invention will be specifically pointed out or will become apparent from a reading of the specification considered in conjunction with the accompanying drawings wherein:

Fig. 1 is a front elevational view of the welding machine;

Fig. 2 is a side cross-sectional view of the welding machine taken on the line 2—2 of Fig. 1;

Fig. 3 is a side cross-sectional view similar to Fig. 2 but taken on the line 3—3 of Fig. 1;

Fig. 4 is a fragmentary cross-sectional view taken on the line 4—4 of Fig. 3;

Fig. 5 is a rear view of the welding machine; and

Fig. 6 is a fragmentary detail of the cam and rocker arm illustrated in Fig. 1.

Referring to the drawings wherein like numerals designate like and corresponding parts, the embodiment disclosed therein to illustrate the invention comprises essentially a body or frame 10, an electrode carrying clamping head 11 mounted on the frame, adjusting levers 14 and 15 pivotally mounted on the frame, a saddle 12 universally mounted on the adjusting levers 14 and 15 and straddling the frame 10, an electrode carrying clamping platen 13 mounted on the saddle 12, and cam and pneumatic advancing and retracting toggle means 16 connecting between the saddle 12 and the frame 10.

More particularly, the invention comprises a frame 10 having adjacent one end and on top thereof a stationary anvil 17 into which a lower electrode 18 is fitted and secured. Approximately midway between the ends of the frame is a shaft 19 suitably positioned in the frame and extending from front to rear thereof. A pair of levers 14, 15, are rockably mounted intermediate their ends on shaft 19, one at the front of the frame and the other at the rear of the frame.

Universally mounted on one end of levers 14, 15 is a saddle 12 having legs 20 and 21 which straddle the frame 10. The lower extremities of legs 20 and 21 terminate in bifurcated sections 22 and 23, respectively, which facilitate connection to levers 14 and 15. Since the legs of the saddle and the connections of the legs to the levers are identical, only the connection of leg 20 to lever 14 will be described in detail.

The end of lever 14 fits into the bifurcated section 22 of saddle leg 20 and is apertured for reception of a pin 24 which also extends through the bifurcated section 22. Interposed between the pin 24 and the lever 14 is a spherical bushing 26 and a retainer ring 28 having a groove 30 therein which provides a seat for the end of lever 14. The retainer ring 28 and lever 14 are retained in relatively non-rotatable relation by means of a cap screw not shown, extending through ring 28 into lever 14. Pin 24 is maintained in proper position relative to saddle leg 20 by means of a pin keeper 34 secured to the face of bifurcated section 22 and being received in a slot in the body of pin 24. The connection of lever 14 to saddle leg 20 is a universally adjustable, ball and socket connection; the retainer ring 28 and, consequently, the lever 14 being capable of sliding movement over the spherical bushing 26 in any direction.

The ends of adjusting levers 14 and 15 remote from their connections to saddle 12 are provided with squared tips 38 and 39 which are projected between outwardly extending ears 40, 42 and 41, 43, respectively, secured to the frame 10. Ears 40, 42 and 41, 43 are threaded internally and receive upper and lower adjusting screws 44, 46 and 45, 47, respectively, which adjustably engage and hold the tips 38 and 39 therebetween. Each set of ears is equipped with a graduated scale 48 and 49 secured to the frame and adapted to be used in conjunction with a witness line 50, 51 on each tip 38 and 39 and with the adjusting screws to raise, or lower, or tilt the saddle with respect to the frame to provide an adjustment which will be more fully described subsequently.

The stationary electrode 18 is provided with a cooperating electrode adapted to be moved into clamping relation therewith. The structure of the latter electrode and clamping mechanism is best illustrated in Figs. 2 and 5 wherein the frame 10 is provided at its rear with a transversely extending bracket 52 formed integral with the frame 10. Bolted or otherwise suitably secured on the underside of bracket 52 is a U-shaped bracket 53 adapted to mount a pneumatic cylinder 54 between the legs of the U by means of a bolt 55 extending through a bifurcated tongue 56 secured to the base of cylinder 54 and through a portion of the web 57 of U-shaped bracket 53.

At the inner end of bracket 52 is pivotally mounted, by means of pivot pin 58, a clamping lever 60 equipped with a forwardly projecting jaw 61 which carries upper electrode 62. The rear end of clamping lever 60 extends upwardly of bracket 52 and is equipped with a pivotally mounted segment 63 of turnbuckle 64. The other segment 65 of turnbuckle 64 is pivotally secured to the center section of a toggle lever 66. The rear section of toggle lever 66 is pivotally secured as at 67 to bracket 52 and the front section of toggle lever 66 is pivotally secured as at 68 to piston rod 69 which carries a piston reciprocably received in pneumatic cylinder 54. It will now be obvious that clamping lever 60 and jaw 61 may be actuated through the piston, piston rod 69, toggle lever 66, and turnbuckle 64 to rock about pivot pin 58 to clamp and unclamp a wheel rim R between the electrode 62 carried by jaw 61 and electrode 18 carried by anvil 17. Turnbuckle 64 may be used to compensate for the erosion of the electrodes during use so that proper pressure is maintained on the wheel rim R. Fig. 2 illustrates the wheel rim R as being clampingly received between electrodes 62 and 18.

Referring now to Figs. 3, 4, and 5, the saddle 12 has a seat section 70 to which is secured, by bolts 71 or other suitable means, an anvil 35 into which is fitted and secured electrode 36. Forming a part of the anvil 35 is a rearwardly extending bracket 72 which supports a pneumatic cylinder bracket 73 having a cylinder 74 secured to bracket 73 in the same manner as cylinder 54 shown in Fig. 2. Rockably mounted as at 73 on bracket 72 is clamping lever 80, provided at its forward end with jaw 81 which carries electrode 82. The rear end of clamping lever 80 is connected to bracket 72 through turnbuckle 84 and toggle lever 86 which are identical to corresponding elements illustrated and described in connection with Fig. 2. The clamping action of lever 80 and jaw 81 in conjunction with anvil 35 is the same as that illustrated and described in conjunction with Fig. 2, but it must be remembered that anvil 35, bracket 72, clamping lever 80, and jaw 81 are mounted on the movable saddle rather than on the frame for a purpose which will be fully explained hereinafter.

In Fig. 4 is illustrated the pivotal connection of clamping arm 80 to bracket 72. As shown therein the anvil 35 is provided with an outer upstanding ear 75 and an inner upstanding ear 76 having aligned bores therethrough for reception of pin 78. The clamping lever 80 is an inverted U-shape in cross-section and its walls 77 are bored so as to align with the bores in the ears enabling pin 78 to extend into walls 77 and be suitably journaled therein as by roller bearings 79. The outer ear 75 is provided with a pin keeper 88 which fits into a slot in pin 78 and maintains the pin in fixed relation to the ears. The inner edge may be provided with a cover plate 87 suitably secured to the surface of the ear by bolts or otherwise. The connection of clamping arm 60 to bracket 52 (Fig. 2) is the same as that just described.

Referring again to Fig. 1, the frame 10 is provided with an interior housing for a transformer 90, the latter having connections (not shown) to the electrodes and also being connected to control means (not shown). At the other end of the frame 10 is a cam shaft 91 which extends through the frame and carries at its front end a cam 92. The rear end of shaft 91 is driven by a motor 93 (Fig. 5) through a chain drive 94 and rotates cam 92 in a clockwise direction as viewed in Fig. 1. That end of cam shaft 91 adjacent chain drive 94 carries a plurality of contact cams (not shown) which make and break the circuits leading to electrical solenoids for actuating the electrical and pneumatic phases of the cycle. These contact cams and the means actuated thereby are not shown in the drawings, however, in the interests of clarity of the drawings and because such expedients are so well known in the art as to preclude any lack of understanding of the invention on the part of one skilled in the welding art.

Pivotally mounted at 95 on the frame 10 is toggle means 16 comprising a rocker arm 96 provided with a cam follower 97 intermediate its ends. Adjacent pivot 95, rocker arm 96 is connected to saddle 12 by means of a turnbuckle 32 pivotally connected to the saddle as at 98 and pivotally connected to the rocker arm as at 99. The extreme end of rocker arm 96 is pivotally connected at 100 to a link 101 which in turn is connected to piston rod 103 of pneumatic cylinder 102. The upper part of piston rod 103 and cylinder head 104 are surrounded by a boot 105 to keep dirt and foreign matter from collecting in cylinder 102.

When the platen advancing and retracting toggle 16 is in its normal position, as illustrated in Fig. 6, piston 106 is positioned farther down in cylinder 102 than shown in Fig. 1. Air pressure on both sides of piston 106 is then about equal so that piston 106 is in equilibrium. As cam follower 97 follows cam 92, rocker arm 96 and piston 106 are slowly raised, pivoting about pivot 95, and saddle 12, together with the movable electrodes 36 and 82 mounted thereon, is slowly pushed toward the stationary set of electrodes 18 and 62. Cam 92 continues to elevate rocker arm 96 and at a predetermined point, the air in the upper part of cylinder 102 is quickly exhausted. At this point the air in the lower part of cylinder 102 immediately expands exerting considerable force on piston 106 so as to impart a sharp upward thrust to rocker arm 96 causing saddle 12 to move toward the stationary set of electrodes at an extremely fast rate of speed. The expansion of air in the lower part of cylinder 102 is sufficiently rapid and forceful to raise rocker arm 96 to such an extent that cam follower 97 is lifted completely free from cam 92 as illustrated in Fig. 1. The upward momentum of rocker arm 96 is checked both by gravity and the resistance caused by the physical contact of the edges of the wheel rim clamped between the two sets of electrodes. The timing of the welding stage of the cycle is such that when the upward momentum of rocker arm 96 has been overcome, cam 92 has revolved beyond its peak 92a. At this point the automatic retraction of the platen takes place and is accomplished by air being automatically injected into the upper part of cylinder 102 causing piston 106 to move downwardly thereby restoring rocker arm 96 to its original position. As piston 106 moves downwardly in cylinder 102, the air in the lower part of the cylinder is compressed. The compresion of the air permits a cushioned contact between the cam follower and the cam.

The initial distance between the movable set of electrodes carried by the platen and the stationary set of electrodes carried by the frame may be set by adjusting cam follower 97. The distance may be decreased by extending the length of cam follower 96 via screw 97a and the distance may be increased by shortening the length of cam follower 96 via screw 97a. Screw 97a is equipped with a lock nut 97b to maintain the desired position of cam follower 97.

The various elements and details of the invention having been pointed out, the operation of the machine will now be described so that a clear understanding of the invention may be had.

The welding of a wheel rim or the like may be said to be accomplished in a four stage cycle, namely: a clamping stage; a heating stage; a welding stage; and a release stage. To begin operation, an operator takes a rolled rim strip and positions it in lower electrodes 18 and 36 carried by anvils 17 and 35, respectively and under jaws 61 and 81. The edges of the rim strip must be placed in practically aligned spaced relationship so it is essential that electrodes 18 and 36 be at the same height and coplanar. Having positioned the rim strip, the operator starts the machine in motion. Pneumatic cylinders 54 and 74 are actuated by means not shown to move jaws 61 and 81 together with electrodes 62 and 82 into clamping engagement with the rim strip. The rim is now tightly clamped between the electrodes and at this point the heating stage of the cycle begins. Electric current is directed to the electrodes by means not shown thereby heating the edges of the rim strip. During the heating stage arcing occurs burning off the uneven edges of the strips so that they are even. As the heating and burning off of the edges begins motor 93 drives cam 92 in a clockwise direction. As seen in Figs. 1 and 6, the slope of cam 92 from its initial point is very gentle so that elevation of rocker arm 96 is slight at the beginning of rotation of cam 92. Elevation of rocker arm 96 causes saddle 12 and electrodes 36 and 82, and consequently the rim edge clamped between those electrodes, to move slowly toward the other edge of the rim clamped between electrodes 18 and 62. Continued rotation of cam 92 moves the movable electrodes 36 and 82 closer to the stationary electrodes 18 and 62. The timing of cam 92 is such that when the rim edges have been heated to the point that they are smooth and in plastic condition, rocker arm 96 has been raised to a height sufficient to open an exhaust valve or vent in the upper part of cylinder 102 and permit the compressed air therein to escape whereupon the compressed air in the lower part of cylinder 102 very rapidly expands and rapidly elevates rocker arm 96 which causes the saddle to be moved very rapidly toward the stationary electrodes 18, 62 whereby the edges of the rim are joined and merged together in a smooth weld. At this point the current to the electrodes is shut off, the jaws 61 and 81 are next unclamped, and the rocker arm drops, returning the saddle to its initial position. The operator removes the welded rim from the machine and places an unwelded rim therein and repeats the entire operation.

Continued operation of the welding machine results in erosion of the two sets of electrodes. The erosion of the sets of electrodes is almost always uneven which means that the opposed edges of the rim will not lie in the same plane when clamped between the electrodes, but one edge of the rim will be higher than the other or one edge will be cocked or canted with respect to the other. In prior art rim welding machines it has been necessary to shut down the machine and adjust the electrodes through the use of shims to once again bring the edges of the rim in abutting relation in the same plane. The necessity of shutting down the machine to adjust the electrodes with shims is a time consuming, laborious, and expensive undertaking. With the instant welder the electrodes may be adjusted in a matter of moments which naturally results in a tremendous saving.

In the instant machine, when the operator notes that the edges of the wheel rim are no longer coplanar he may very easily and quickly remedy the defect. Let it be assumed that the electrode 18 carried by the frame is higher than the electrode 36 carried by the saddle. All that is required to be done is elevate electrodes 36, 82 to the same level as electrodes 18, 62. This elevation is accomplished by manipulating adjusting screws 44, 46 so that the end 38 of adjusting lever 14 rotates clockwise about shaft 19. Clockwise rotation of lever 14 results in an upward movement of saddle leg 20 which means that the front edge of electrodes 36, 82 will be raised. The distance end 38 of lever 14 has been lowered to raise electrode 36 can be observed by reading the scale 48 in conjunction with witness line 50. Electrodes 36, 82 can be leveled by moving end 39 of adjusting lever 15 downwardly a corresponding distance as measured on scale 49. It is obvious that if electrodes 36, 82 are higher than electrodes 18, 62 the rotation of levers 14, 15 about their respective pivots need only be reversed to lower electrodes 36, 82 with respect to electrodes 18, 62.

It almost never occurs that sets of electrodes evenly erode. The usual situation is that one set erodes more than the other and/or in different places so that the electrodes, instead of being level, present a sloping or uneven surface relative to each other. This uneveness is quickly and easily remedied in the instant welding machine by raising or lowering, via the appropriate adjusting lever, that side of the saddle supporting the adjustable and movable set of electrodes. For example, assume that stationary electrodes 18, 62 have eroded more at the front than movable electrodes 36, 82. If this be the case, the edges of the wheel rim will not abut in the same plane but will be cocked with respect to each other resulting in an uneven weld and a warped rim. To correct the defect, it is necessary only to rotate adjusting lever 14 counterclockwise about its pivot 19 via the adjusting bolts 44, 46. The counterclockwise rotation of adjusting lever 14 lowers the front side of saddle 12, and, consequently, electrodes 36, 82, until the latter is in the same plane as electrodes 18, 62. Inasmuch as the jaw 81 is mounted on the saddle, it, too, will follow the movement of the saddle so that no inequalities of pressure result during clamping of the rim edge. Lateral movement of saddle 12 will not cause any binding between saddle legs 20, 21 and their connections to adjusting levers 14, 15 because the universal mountings between the two permit relative movement without restraint.

The description of the particular welding machine disclosed herein has been limited to vehicle wheel rim welding, but it should be understood that this description is for illustrative purposes only and not in any sense for limiting the invention solely to a rim welder as the machine is adapted for many other purposes.

Although but one embodiment of the invention has been shown and described in detail, it is obvious that the invention is susceptible of many changes in shape, size, detail, and arrangement of various elements within the scope of the appended claims.

I claim:

1. A welding machine having paired sets of clamping electrodes with a first set stationary and non-adjustable as a set and a second set movable and adjustable as a set relative to said first set comprising a machine body, jaw clamping mechanism mounted on said body, a first set of mating electrodes having one portion mounted on said body and the other portion carried by said clamping mechanism so as to receive and hold a part to be welded therebetween, a first independently adjustable lever arm having a free end and a secured end pivotally mounted on one side of said body, a ball joint carried by the free end of said first lever arm, a second independently adjustable lever arm having a free end and a secured end pivotally mounted on another side of said body, a ball joint carried by the free end of said second lever arm, a saddle over said body in spaced relation thereto, jaw clamping mechanism carried by said saddle, a second set of mating electrodes having one portion mounted on said saddle and the other portion carried by said clamping mechanism so as to receive and hold a part to be welded therebetween; said saddle and electrodes thereon being universally tiltably supported on said lever arms via said ball joints so as to be universally locatable relative to said body and electrodes thereon via changing the position of the secured ends of said levers relative to said body and each other so as to align said second set of electrodes relative to said first set of electrodes; said saddle and electrodes thereon being rockably supported on said lever arm via said ball joints so as to advance said second set of electrodes thereon toward said first set of electrodes on said body; and mechanism adapted to rock said saddle.

2. A welding machine having paired sets of clamping electrodes with a first set stationary and non-adjustable as a set and a second set movable and adjustable as a set relative to said first set comprising a machine body, jaw clamping mechanism mounted on said body, a first set of mating electrodes having one portion mounted on said body and the other portion carried by said clamping mechanism so as to receive and hold a part to be welded therebetween, a first independently adjustable lever arm having a free end and a secured end pivotally mounted on one side of said body, a ball joint carried by the free end of said first lever arm, a second independently adjustable lever arm having a free end and a secured end pivotally mounted on another side of said body, a ball joint carried by the free end of said second lever arm, a saddle over said body in spaced relation thereto, a jaw clamping mechanism carried by said saddle, a second set of mating electrodes having one portion mounted on said saddle and the other portion carried by said clamping mechanism so as to receive and hold a part to be welded therebetween; said saddle and electrodes thereon being universally tiltably supported on said lever arms via said ball joints so as to be universally locatable relative to said body and electrodes thereon via changing the position of the secured ends of said levers relative to said body and each other so as to align said second set of electrodes relative to said first set of electrodes; said saddle and electrodes thereon being rockably supported on said lever arms via said ball joints so as to advance said second set of electrodes thereon toward said first set of electrodes on said body; a toggle linkage operably connected to rock said saddle on said ball joints relative to said body so as to advance and retract said second set of electrodes thereon relative to said first set of electrodes on said body, a cam operably connected to actuate said toggle linkage during the heating and burning portion of the cycle, and a pneumatic ram operably connected to accuate said toggle linkage during the merging portion of the cycle.

3. A welding machine having paired sets of clamping electrodes with a first set stationary and non-adjustable as a set and a second set movable and adjustable as a set relative to said first set comprising a machine body, a first jaw clamping mechanism mounted on said body, a first set of mating electrodes having one portion mounted on said body and the other portion carried by said clamping mechanism so as to receive and hold a part to be welded therebetween, a first independently adjustable support mounted on one side of said body, a first universally movable joint carried by said first support, a second independently adjustable support mounted on another side, a second universally movable joint carried by said second support, a saddle over said body in spaced relation thereto, a jaw clamping mechanism carried by said saddle, a second set of mating electrodes having one portion mounted on said saddle and the other portion carried by said clamping mechanism so as to receive and hold a part to be welded therebetween; said saddle and electrodes thereon being universally tiltably supported on said supports via said first and second universally movable joints so as to be universally locatable relative to said body and electrodes thereon via changing the position of said supports relative to said body and each other so as to align said second set of electrodes relative to said first set of electrodes; said saddle and electrodes thereon being rockably supported on said lever arms via said joints so as to advance said second set of electrodes thereon toward said first set of electrodes on said body; and mechanism adapted to rock said saddle.

4. A welding machine having paired sets of clamping electrodes with a first set stationary and non-adjustable as a set and a second set movable and adjustable as a set relative to said first set comprising a machine body, jaw clamping mechanism mounted on said body, a first set of mating electrodes having one portion mounted on said body and the other portion carried by said clamping mechanism so as to receive and hold a part to be welded therebetween, a first independently adjustable support mounted on one side of said body, a first ball joint carried by said support, a second independently adjustable support mounted on another side of said body, a second ball joint carried by said support, a saddle over said body in spaced relation thereto, jaw clamping mechanism carried by said saddle, a second set of mating electrodes having one portion mounted on said saddle and the other portion carried by said clamping mechanism so as to receive and hold a part to be welded therebetween; said saddle and electrodes thereon being universally tiltably supported on said supports via said joints so as to be universally locatable relative to said body and electrodes thereon via changing the position of said supports relative to said first set of electrodes; said saddle and electrodes thereon being rockably supported on said lever arms via said ball joints so as to advance said second set of electrodes thereon toward said first set of electrodes on said body; relatively slow cam operated linkage operably connected to rock said saddle relative to said body so as to advance said second set of electrodes thereon relative to said first set of electrodes on said body during the heating and burning stages of the welding cycle, and relatively fast acting ram means operably connected to power said linkage during the merging portion of the welding cycle.

5. A welding machine comprising a frame, a first set of electrodes mounted on said frame, an adjusting lever rockably mounted on each side of said frame, a saddle straddling said frame and being supported by said adjusting levers, and a second set of electrodes carried by said saddle, said saddle being adjustable via said adjusting levers whereby said second set of electrodes may be adjusted relative to said first set of electrodes so that both sets of electrodes lie in the same plane.

6. A welding machine as set forth in claim 5 wherein the supports between said adjusting levers and said saddle comprise universally adjustable joints.

7. In a welding machine having a frame, a stationary set of clamping electrodes mounted on said frame, a movable support, and a second set of clamping electrodes secured in the movable support mounted on said frame, the combination therewith of adjusting means adapted to adjust said second set of electrodes relative to said stationary set of electrodes, said adjusting means including a universal connection to said movable support whereby said second set of electrodes may be adjusted in all planes to compensate for uneven erosion of the two sets of electrodes.

8. A welding machine having a frame, a stationary set of clamping electrodes mounted on said frame, a second set of clamping electrodes mounted on a movable support, and means adapted to adjust said second set of electrodes with respect to said stationary set of electrodes, said means comprising at least one lever arm pivoted on said frame and having one end connected to and supporting said movable support, said lever arm being rockable about its pivot point to adjust said support and the position of said movable set of electrodes relative to said stationary set of electrodes.

9. A welding machine as set forth in claim 8 wherein said connection between said lever arm and said movable support comprises a universally adjustable connection.

10. A welding machine as set forth in claim 8 wherein said frame is provided with means to hold said support with said second set of electrodes in its adjusted position.

11. A welding machine comprising a frame, a stationary set of clamping electrodes mounted on said frame, a movable support mounted on said frame, and a second set of clamping electrodes carried by said movable support, said movable support comprising a saddle straddling said frame and being connected to and supported by a pair of lever arms each of which is rockably secured to said frame and means connected to said lever arms to rock said lever arms to adjust the position of said support with said second set of electrodes relative to said stationary set of electrodes.

12. A welding machine as set forth in claim 11 wherein each lever arm of said pair of lever arms is independently rockable whereby said support with said second set of electrodes may be cocked relative to said stationary set of electrodes.

13. A welding machine as set forth in claim 11 wherein the connection between said movable saddle and said pair of lever arms comprise universally adjustable ball and socket joints.

14. A welding machine as set forth in claim 11 wherein said frame is provided with means to hold each lever arm in its adjusted position.

References Cited in the file of this patent

UNITED STATES PATENTS

| | | |
|---|---|---|
| 913,616 | Buchenberg | Feb. 23, 1909 |
| 924,868 | Winfield et al. | June 5, 1909 |
| 1,654,563 | Taylor | Jan. 3, 1928 |
| 1,976,250 | Turnquist | Oct. 9, 1934 |
| 2,499,281 | Riley | Feb. 28, 1950 |
| 2,509,606 | McPhee et al. | May 30, 1950 |